Patented Dec. 27, 1949

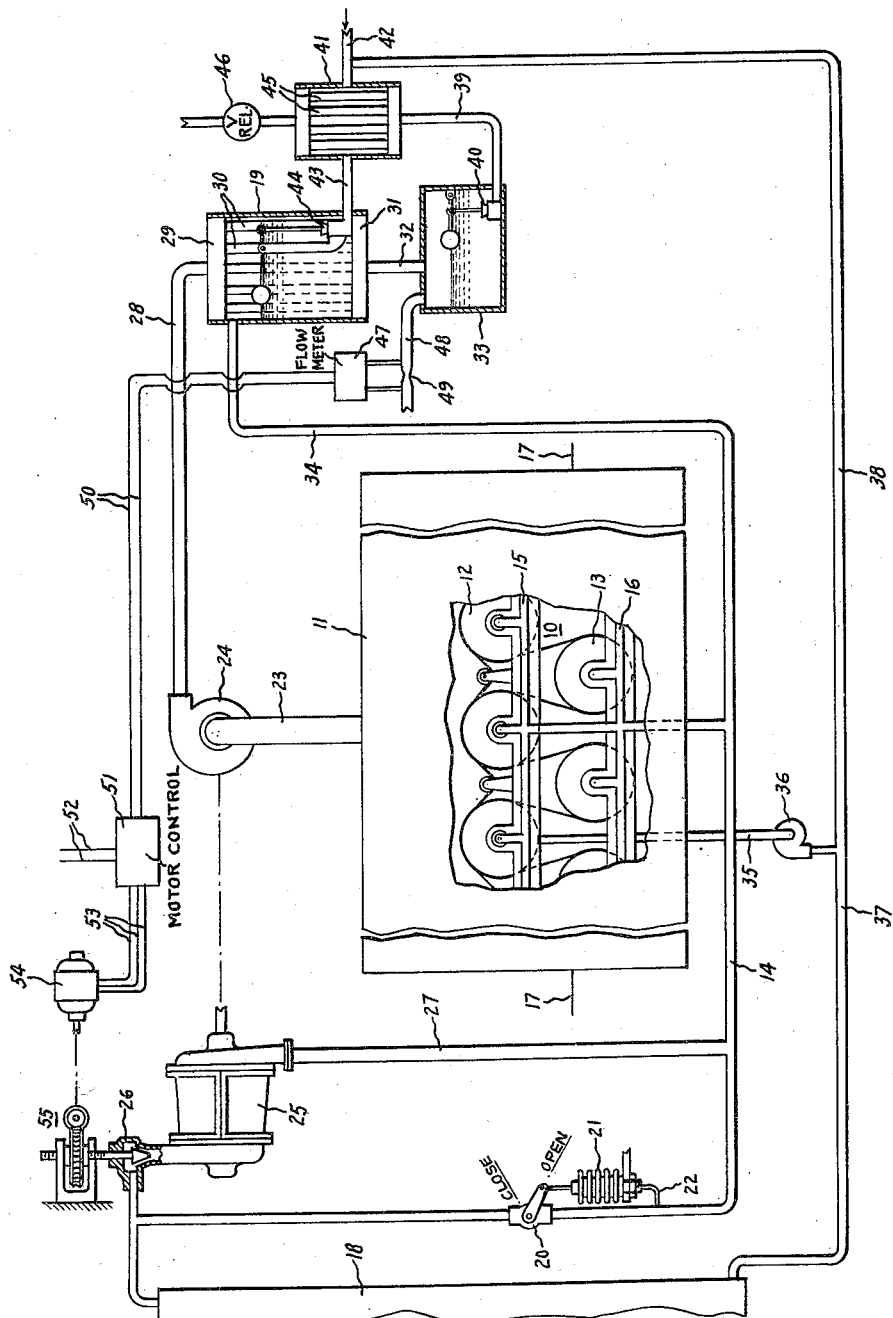

2,492,754

UNITED STATES PATENT OFFICE 2,492,754

MATERIAL DRYING APPARATUS

Samuel Martin, Jr., Ballston Lake, N. Y., assignor to General Electric Company, a corporation of New York Application October 30, 1948, Serial No. 57,548

4 Claims. (Cl. 34—48)

My invention relates to drying apparatus of the type employing process steam and particularly to such apparatus for effecting more economical operation of continuous process dryers, such as those employed for drying paper.

In material drying equipment, such as that employed in the paper industry for the continuous drying of paper as it is manufactured, large quantities of process steam are employed for various purposes including the drying of the paper. In order to effect economical operation of such plants, it is desirable that the maximum amount of heat available in the steam be employed and it is, therefore, desirable to recover heat from processes such as the drying process. Large amounts of water are evaporated from the dryers and heat is carried away in this manner. It is desirable to recover heat normally carried away in the evaporated water, and accordingly, it is an object of my invention to provide a material drying system including an improved arrangement for recovering heat from the drying process.

It is another object of my invention to provide a material drying system and an improved arrangement for controlling the system and recovering heat from the water vapor removed during the drying process.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing, the single figure of which represents diagrammatically a continuous paper dryer provided with a drying system embodying my invention.

Referring now to the drawing, the material drying system illustrated comprises a paper dryer 10 arranged within a housing 11. The dryer comprises a plurality of upper and lower rolls or rotating cylinders 12 and 13, respectively. The cylinders 12 and 13 are heated by steam supplied thereto from a line 14 and upper and lower distributing manifolds 15 and 16, respectively, the manifolds being arranged to supply steam to the rollers in the usual manner by connections at the hubs of the rollers. The paper to be dried and indicated at 17 enters the dryer from the left end, passes over the rollers, and the dry paper is removed at the right end of the dryer, the process being continuous. Steam for heating the rolls is supplied from two sources: first, a boiler 18 and, second, an auxiliary boiler 19. The supply of steam from the boiler 18 is maintained at a predetermined desired pressure by operation of a valve 20 under control of a bellows 21 connected through a tube 22 to the supply conduit 14.

When the dryer is in operation, water vapor removed from the paper 17 is collected in the housing 11, which may or may not be totally enclosed depending upon the type of equipment employed, and this water vapor is removed through an exhaust connection 23 by operation of a compressor 24. The compressor 24 is driven by a suitable prime mover, such as a steam turbine 25, which is supplied with steam from the boiler 18 by operation of a valve 26. The exhaust steam from the turbine 25 is supplied to the conduit 14 through an exhaust connection 27. The water vapor leaving the housing 11, which is normally at a temperature around 212° F., is compressed by the compressor 24 and may attain a temperature of, say 375° F. The compressor 24 thus discharges superheated steam, and this steam is discharged through a line 28 and passes through a header 29 in the boiler 19 and tubes 30 to a discharge header 31. The heat is removed by the boiling of the water in the boiler 19 and the condensed water vapor flows through a connection 32 to a sump or separator 33. In addition to compressing water vapor, the compressor 24 also withdraws and compresses air which is not condensable within the boiler 19 and is discharged through the conduit 32 and separated from the condensate in the tank 33. The steam generated in the boiler 19 flows through a line 34 to the supply line 14 of the dryer. The heat of the water vapor discharged from the housing 11 is thus returned to the dryer. During the drying process, the steam supplied to the rolls 12 and 13 is condensed and is removed through a condensate line in the usual manner. This line has been shown as a pipe 35 which may be connected to the hubs of the rolls in a manner similar to the steam supply connections. Condensate may be supplied by operation of a pump 36 as feed water to the boilers 18 and 19, suitable lines 37 and 38 respectively being indicated for this purpose. The condensate from the tank 33 is supplied through a connection 39 under control of a float valve 40 to a preheater 41 for the boiler 19. The preheater is supplied with feed water through a connection 42 and supplies the boiler 19 through an outlet 43 under control of a float valve 44 dependent upon the level of the water in the boiler 19. The hot condensate 39 flows through tubes 45 in the preheater 41 and heats the supply water for the boiler 19. The flow of condensate through the preheater 41 is also under control of a flow limiting or relief valve 46 on the discharge side of the preheater.

It is desirable to control the operation of the compressor 24 in accordance with the required rate of removal of water vapor, and in order to effect this control, I provide a flow meter 47 on a relief or air discharge pipe 48 for removing noncondensables from the condensate tank 33. The construction of the flow meter has not been shown in detail as it is not necessary to an understanding of my invention, it being indicated merely as a device dependent upon rate of flow through the conduit 48 and determined by the pressures on two sides of a venturi 49. The flow meter is connected through lines 50 to a motor controller 51 arranged between supply lines 52 and motor leads 53 for a motor 54 which actuates the value 26 through a gearing 55. The operation of the motor 54 is controlled so that the supply of steam to the turbine 25 is increased to increase the speed of the compressor 24 upon a decrease in the rate of flow of noncondensable vapors through the discharge conduit 48. It will thus be seen that the operation of the compressor 24 is dependent upon the rate of removal of water vapor from the housing 11. The operation of the valve 20 under control of the bellows 21 maintains the required steam pressure for supplying the rolls 12 and 13 regardless of the speed of the turbine 25; however, whenever heat is available in the water vapor removed from the housing 11, the turbine will operate and drive the compressor 24 so that steam will be supplied from the turbine exhaust 27 and also from the boiler 19. The operation of the valve 20 is thus in the nature of a make-up valve to supply steam in the event the supply through the turbine exhaust and boiler 19 is inadequate to maintain the required minimum pressure.

By utilizing the superheated vapor discharged from the compressor 24 to generate steam in the boiler 19 and, further, by employing the condensate to heat the boiler feed water for the boiler 19, considerable economy in the operation of the drying system may be effected. This economy is further realized by operation of the compressor 24 in accordance with the required rate of removal of water vapor from the material to be dried. It should be noted that the operation of the compressor 24 is as a heat pump, that is, as a pump for raising the level of the heat available in the water vapor sufficiently to enable it to be used for further application in the drying system. It thus becomes unnecessary to discharge the water vapor because of its relatively low temperature.

While I have illustrated my invention in connection with a paper dryer of the continuous type employing rolls as heat exchangers, other applications will readily be apparent to those skilled in the art and I do not desire my invention to be limited to the particular arrangement illustrated and described, and I intend by the appended claims to cover all modifications within the spirit and scope of my invention.

What I claim as new and desire to secure by Letters Patent of the United States is:

1. A material drying system comprising an enclosure for the material to be dried, a compressor arranged to withdraw water vapor from said enclosure for compressing and heating the water vapor, a steam driven prime mover for driving said compressor, means for conducting exhaust steam from said prime mover into heat exchange relationship with the material in said enclosure to heat said material, and means arranged to employ said hot compressed water vapor for generating and supplying additional steam to said conducting means for heating said material.

2. A material drying system comprising an enclosure for the material to be dried, a compressor arranged to withdraw water vapor from said enclosure for compressing and heating the water vapor, a first source of steam, a steam driven prime mover connected to said source for driving said compressor, means for conducting exhaust steam from said prime mover into heat exchange relationship with the material in said enclosure to heat said material, means arranged to utilize the heat of said hot compressed water vapor and constituting a second source of steam for supplying additional steam to said conducting means for heating said material, and means actuated in response to the pressure of the steam in said conducting means for discharging steam directly from said first source into said conducting means to maintain a predetermined pressure therein.

3. A material drying system comprising an enclosure for the material to be dried, a compressor arranged to withdraw water vapor from said enclosure for compressing and heating the water vapor, a first source of steam, a steam driven prime mover connected to receive steam from said source for driving said compressor, means for conducting exhaust steam from said prime mover into heat exchange relationship with the material in said enclosure to heat said material, means arranged to utilize the heat of said hot compressed water vapor and constituting a second source of steam for supplying additional steam to said conducting means for heating said material, and means responsive to the condition of operation of said second source for controlling the speed of said prime mover.

4. A material drying system comprising an enclosure for the material to be dried, a compressor arranged to withdraw water vapor from said enclosure for compressing and heating the water vapor, a first source of steam, a steam driven prime mover connected to said source for driving said compressor, means for conducting exhaust steam from said prime mover into heat exchange relationship with the material in said enclosure to heat said material, means arranged to utilize the heat of said hot compressed water vapor and constituting a second source of steam for supplying additional steam to said conducting means for heating said material, and means dependent upon the rate of removal of noncondensable gas from said enclosure by operation of said compressor for controlling the speed of said prime mover.

SAMUEL MARTIN, Jr.

REFERENCES CITED

The following references are of record in the file of this patent:

UNITED STATES PATENTS

| Number | Name | Date |
| --- | --- | --- |
| 1,277,895 | Foster | Sept. 3, 1918 |
| 2,192,168 | Bell | Mar. 5, 1940 |
| 2,283,699 | Richardson | May 19, 1942 |